Figure 2:
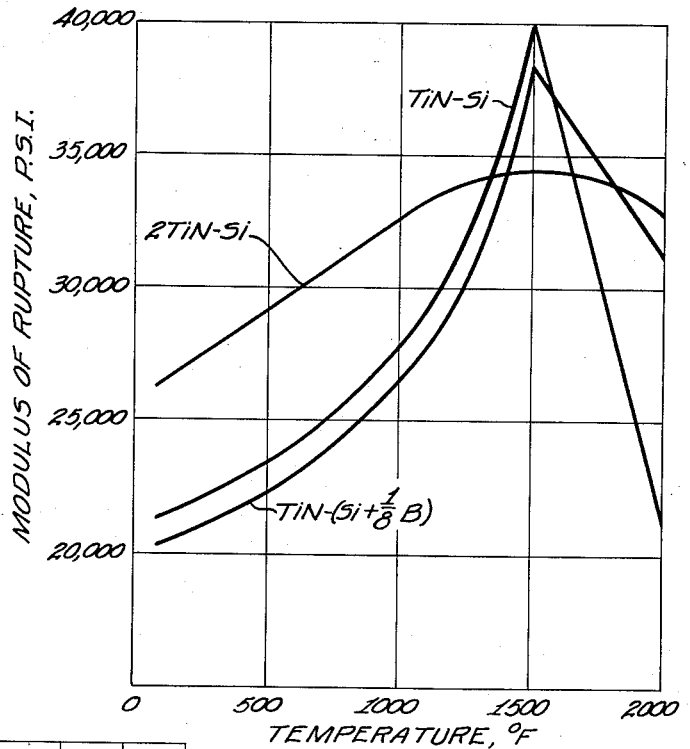

May 17, 1966  E. COLTON  3,251,698
HIGH TEMPERATURE MATERIAL
Filed May 14, 1962

Inventor
Ervin Colton
by Richard R. Mybeck
Attorney 3,251,698
HIGH TEMPERATURE MATERIAL
Ervin Colton, Wauwatosa, Wis., assignor to Allis-Chalmers Manufacturing Company, Milwaukee, Wis.
Filed May 14, 1962, Ser. No. 194,430
5 Claims. (Cl. 106—55)

The present invention relates generally to refractory compositions and more particularly to refractory compositions based upon titanium nitride which are especially useful in air at high temperatures, which possess considerable strength at elevated temperatures even in oxidizing environment, and which are unexpectedly resistant to high temperature and high pressure water.

The advance of technology has increased the demand for materials to withstand higher operating temperatures, such as in jet engines. Associated with these higher temperatures, there is a need for materials possessing strength at operating temperatures above about 1100° C. There is also a continuing search for new materials capable of withstanding high temperature-high pressure water, such as 538° C. and 1000 p.s.i.a., which conditions are encountered in certain types of boiling water reactors.

Titanium nitride has been known for a long time as an interstitial compound of titanium and nitrogen ideally in a 1:1 molar ratio; i.e., Ti:N, although titanium and nitrogen molar ratios of 1:1 to 1:0.42 represent stable titanium nitride phases. The material having a Ti:N molar ratio 1:1 has a specific gravity of 5.21 and a melting point of 3220° C.

Although titanium nitride is quite stable in inert atmosphere and has a decomposition pressure of only $10^{-3}$ atmospheres at 2200° C., it is not stable in the presence of oxygen. Oxides begins to form at approximately 500° C., and the nitride forms the monoxide TiO, the sesquioxide $Ti_2O_3$, and eventually the dioxide $TiO_2$. Furthermore, in the presence of water, titanium nitride undergoes hydrolysis to form ammonia.

Highly sintered and dense titanium nitride has numerous desirable properties. It is a fairly good electrical conductor, and it is resistant to a number of molten metals. In addition, it is quite hard. However, its chief drawback is its rather rapid reaction with oxygen at relatively low temperatures.

The prior art has added metals to titanium nitride in order to create so-called "cermets" having improved properties. Thus, strength in particular was increased by bonding titanium nitride with metals, such for example as cobalt, but in doing so, oxidation resistance was significantly decreased.

Accordingly, a prime object of the present invention is to provide an improved refractory composition which is capable of withstanding high operating temperatures, which possesses strength at operating temperatures above about 1100° C., and which is resistant to high temperature-high pressure water.

It is another object of the present invention to provide improved refractory compositions and methods of making same which are based upon the novel coaction of preselected amounts of titanium nitride and elemental silicon whereby strength is increased without resultant decrease of oxidation resistance.

Figure 1:
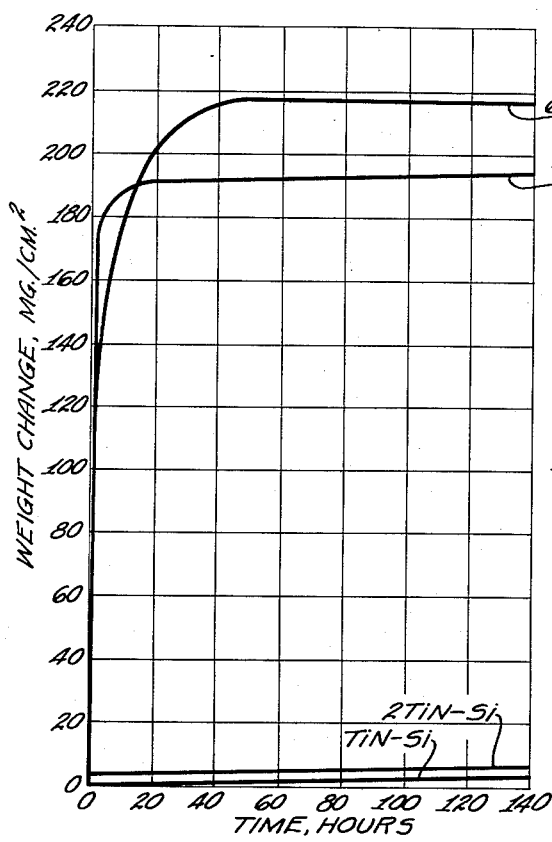

These and still further objects, as shall hereinafter appear, are achieved by the present invention in a remarkably unexpected fashion as can be discerned from a careful consideration of the following detailed description of practices embodying the present invention when read in conjunction with the accompanying drawing in which:

FIG. 1 is a plot of weight change versus time illustrating oxidation resistance of the preferred compositions of the present invention in comparison with TiN and 6TiN-Si; and FIG. 2 is a plot of strength versus temperature for compositions embodying the present invention.

The present disclosure is broadly predicated upon my discovery of refractory compositions especially suited to meet severe operational requirements of the type described above. These compositions are based upon titanium nitride, and especially upon a synergistic combination of titanium nitride and a member of the group consisting of elemental silicon, molybdenum silicide, vanadium silicide, and zirconium silicide.

I have found, to my surprise, that very oxidation resistant compositions of titanium nitride can be formed if elemental silicon, or one of my enumerated silicides, is used in proper combination with the nitride.

Thus, for example, by intimately mixing finely powdered titanium nitride and elemental silicon in the proportions hereinafter described, forming the resulting powdered mixture into parts by cold-pressing, and firing the compressed parts in inert atmosphere, a metallic-looking, very hard, oxidation resistant body results.

As indicated, it is necessary to use the proper ratio of titanium nitride-to-silicon to achieve the advantageous oxidation resistance of this invention. A molar ratio of TiN:Si of from 1:1 to 4:1 is satisfactory for many applications although the ratios of from 1:1 to 2:1, that is, from about 68 wt. percent TiN to about 82 wt. percent TiN are preferred. Although compositions having molar ratios of TiN:Si of less than 1:1 possess good oxidation resistance, a ratio of at least 1:1 is preferred so that the composition has a higher stability and high melting point.

The firing temperature of the mixture is important so that the resulting body is completely sintered. The specific temperature used will, of course, depend upon the amount of additive employed. In the preferred practice of the present invention, a satisfactory sintered body results from the mixture of titanium nitride and elemental silicon at firing temperatures of about 1500° C. to about 1600° C. An atmosphere of argon, helium, or hydrogen is preferred so that the silicon does not undergo significant chemical change. Temperatures above 1600° C. may be employed provided they do not exceed 2500° C. Temperatures above 2500° C. shall not be used in order to avoid significant decomposition of the matrix material TiN.

In addition to silicon, excellent results are obtained by coupling titanium nitride with silicide selected from the group consisting of molybdenum, vanadium and zirconium.

Small (about ½" dia. x ½") right cylindrical samples of various molar ratios of TiN:Si were prepared by mixing the ingredients and cold pressing them into the desired shape. Each of the samples was subjected to oxidation in stagnant air at 1370° C. FIG. 1 shows the beneficial nature of the silicon additive in the compositions TiN:Si and 2TiN:Si.

Test bars about 1½" x ⅜" x ⅛" were also prepared from the various TiN:Si molar ratio compositions described in the examples. The samples were broken by a mid-point loading technique in which the bars were supported between two knife edges spaced 1" apart. Results shown in FIG. 2 demonstrate the excellent strength of these materials even at high temperatures in air.

To further aid in the understanding of the present invention, and not to limit it, the following examples are presented:

Example 1

Finely powdered TiN of at least 90% purity and finely powdered silicon of 98% purity were intimately mixed in a molar ratio of 1:1 and cold pressed under 22 tons of pressure without a binder. The "green" shape was fired at 1648° C. in dry hydrogen for one hour. Considerable shrinkage with no weight loss occurred to yield a very hard, gold-colored product. X-ray powder patterns of the product showed TiN and Si with only a trace of $TiSi_2$. Chemical analysis of the product gave 30.5 wt. percent of Si in comparison to a calculated value of 31.2% expected for a molar ratio of TiN:Si of 1:1. The results obtained by subjecting this sample to a static autoclave at 538° C. and 1000 p.s.i.a. are reported in Table I.

Example 2

An intimate mixture of TiN and Si in a molar ratio of 2:1 was cold-pressed into a bar and fired in argon for two hours at 1482° C. The metallic-looking product gave a chemical analysis of 18.4 wt. percent of Si in comparison to an expected value of 18.5% for a TiN:Si ratio of 2:1. The result obtained when the sample was subjected to the static autoclave of Example 1 are reported in Table I.

Example 3

Intimate mixtures of titanium nitride and molybdenum silicide were prepared having a 1:1 and 2:1 molar ratio. The mixtures were cold-pressed into pellets and then hydrostatically pressed in oil at 40,000 p.s.i. The compacts were next heated in argon atmosphere for one hour at 1550° C.–1610° C. The pellets were tested in a static autoclave at 538° C. and 1000 p.s.i.a. steam for 48 hours. Results are also shown in Table I.

Example 4

Intimate mixtures of titanium nitride and vanadium silicide were prepared having a 1:1 and 2:1 molar ratio. The mixtures were cold-pressed into pellets and then hydrostatically pressed in oil at 40,000 p.s.i. The compacts were next heated in argon atmosphere for one hour at 1550° C.–1610° C. The pellets were tested in a static autoclave at 538° C. and 1000 p.s.i.a. steam for 48 hours. Results are also shown in Table I.

Example 5

Intimate mixtures of titanium nitride and zirconium silicide were prepared having a 1:1 and 2:1 molar ratio. The mixtures were cold-pressed into pellets and then hydrostatically pressed in oil at 40,000 p.s.i. The compacts were next heated in argon atmosphere for one hour at 1550° C.–1610° C. The pellets were tested in a static autoclave at 538° C. and 1000 p.s.i.a. steam for 48 hours. Results are also shown in Table I.

TABLE I.—STEAM CORROSION RESISTANCE OF TITANIUM NITRIDE MATERIALS

[Static autoclave, 538° C. and 1000 p.s.i.a.]

| Sample (Molar Ratios) | T, °C. | D, cm. | L, cm. | W, gm. | V, cm.³ | ρ, gm./cm.³ | ΔW, gm. |
|---|---|---|---|---|---|---|---|
| TiN:MoSi₂ | 1,610 | 1.605 / 1.612 | 0.727 / 0.727 | 6.908 / 6.923 | 1.470 / 1.483 | 4.699 / 4.668 | +0.015 |
| 2TiN:MoSi₂ | 1,610 | 1.700 / 1.700 | 1.400 / 1.400 | 13.696 / 13.711 | 3.176 / 3.176 | 4.312 / 4.317 | +0.015 |
| TiN:VSi₂ | 1,610 | 1.670 / 1.673 | 1.436 / 1.440 | 14.201 / 14.196 | 3.144 / 3.164 | 4.517 / 4.487 | −0.005 |
| 2TiN:VSi₂ | 1,610 | 1.730 / 1.680 | 1.506 / 1.457 | 14.929 / 13.074 | 3.538 / 3.228 | 4.220 / 4.050 | −1.855 |
| TiN:ZrSi₂ | 1,550 | 1.683 / 1.685 | 1.248 / 1.240 | 12.749 / 12.513 | 2.775 / 2.764 | 4.594 / 4.527 | −0.236 |
| 2TiN:ZrSi₂ | 1,550 | 1.602 / 1.605 | 1.320 / 1.315 | 10.007 / 9.981 | 2.659 / 2.659 | 3.763 / 3.754 | −0.026 |
| TiN:Si | 1,550 | 1.631 / 1.630 | 1.275 / 1.267 | 10.526 / 10.521 | 2.662 / 2.643 | 3.954 / 3.981 | −0.005 |
| 2TiN:Si | 1,550 | 1.602 / 1.604 | 1.332 / 1.337 | 13.481 / 13.829 | 2.683 / 2.700 | 5.025 / 5.122 | +0.348 |

In the table: T represents temperature of preparation; D, diameter; L, length; W, weight; V, volume; ρ, density and ΔW, weight change.

From the foregoing it becomes apparent that unique compositions and methods have been herein described which fulfill the aforestated objectives to a remarkably unexpected extent. It is, of course, understood that such modification, applications and alternations as may readily occur to the artisan when confronted with this disclosure are intended with the spirit of the present invention, especially as it is defined by the scope of the claims appended hereto.

The embodiments of the invention in which an exclusive property or privilege is claimed are defined as follows:

1. A refractory composition of matter consisting of titanium nitride admixed with from about 0.25 up to 1 molar equivalents of at least one member of the group consisting of elemental silicon, molybdenum silicide, vanadium silicide and zirconium silicide.

2. A refractory composition of matter consisting of titanium nitride and silicon, the molar ratio of said titanium nitride to said silicon being from about 1:1 to about 4:1.

3. The method of making a refractory body comprising forming a mixture of titanium nitride and from at least 0.25 up to about 1.0 molar equivalents of a member of the group consisting of silicon, molybdenum silicide, vanadium silicide and zirconium silicide; compacting said mixture into a body; firing said body in an inert atmosphere at a temperature of about 1500° C. but not over 2500° C. to sinter said body; and cooling said sintered body.

4. An article of manufacture consisting essentially of a compacted and sintered body consisting of titanium nitride and from at least 0.25 up to about 1.0 molar equivalents of at least one member of the group consisting of silicon, molybdenum silicide, vanadium silicide and zirconium silicide.

5. An article of manufacture consisting essentially of a compacted and sintered body consisting of titanium nitride and silicon, the molar ratio of said titanium nitride to said silicon being from about 1:1 to about 4:1.

References Cited by the Examiner
FOREIGN PATENTS 478,016  1/1938  Great Britain.

TOBIAS E. LEVOW, *Primary Examiner.*

J. POER, *Assistant Examiner.*